United States Patent
Datye et al.

(10) Patent No.: US 9,804,906 B1
(45) Date of Patent: Oct. 31, 2017

(54) SYSTEMS AND METHODS FOR FILESYSTEM-BASED COMPUTER APPLICATION COMMUNICATION

(71) Applicant: MasterCard International Incorporated, Purchase, NY (US)

(72) Inventors: Moreshwar Mukund Datye, Pune (IN); Pradeep Unde, Pune (IN)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 15/354,013

(22) Filed: Nov. 17, 2016

(51) Int. Cl.
  *G06F 3/00* (2006.01)
  *G06F 9/44* (2006.01)
  *G06F 9/46* (2006.01)
  *G06F 13/00* (2006.01)
  *G06F 9/54* (2006.01)

(52) U.S. Cl.
  CPC .................... *G06F 9/544* (2013.01)

(58) Field of Classification Search
  None
  See application file for complete search history.

(56) References Cited

U.S. PATENT DOCUMENTS

| | | | |
|---|---|---|---|
| 7,254,636 B1 | 8/2007 | O'Toole, Jr. et al. | |
| 9,031,710 B2 | 5/2015 | Barrett | |
| 9,172,785 B2 | 10/2015 | Scholz et al. | |
| 9,233,655 B2 | 1/2016 | Barrett | |
| 9,251,631 B2 | 2/2016 | Thompson et al. | |
| 2004/0249526 A1 | 12/2004 | Hauer et al. | |
| 2007/0156710 A1* | 7/2007 | Kern ................. | G06F 17/30165 |
| 2008/0032685 A1 | 2/2008 | Talty et al. | |
| 2010/0115505 A1 | 5/2010 | Touati et al. | |
| 2013/0144838 A1* | 6/2013 | Bhasin .............. | G06F 17/30221 707/637 |
| 2014/0121891 A1 | 5/2014 | Barrett et al. | |
| 2014/0122757 A1 | 5/2014 | Barrett et al. | |
| 2015/0012571 A1* | 1/2015 | Powell .............. | G06F 17/30235 707/827 |
| 2016/0028868 A1 | 1/2016 | Scholz et al. | |
| 2016/0129882 A1 | 5/2016 | Thompson et al. | |

* cited by examiner

*Primary Examiner* — Chat Do
*Assistant Examiner* — William C Wood
(74) *Attorney, Agent, or Firm* — Armstrong Teasdale LLP

(57) ABSTRACT

A method of filesystem-based communication of computer applications is provided. The method implemented using a filesystem communications interface (FCI) computer device coupled to a first computer and a second computer on which computer applications are installed. The method includes mounting file systems on the first computer and second computer by installing communications interface drivers, receiving a data transfer command that includes a data unit from the first computer, identifying that the data transfer command corresponds to a filesystem-based data transfer protocol, generating another data transfer command by converting the first data transfer command into a first network-based data transfer protocol, receiving the data unit from the first computer, and transmitting, using the second communications interface driver, the data unit to the second computer application by the using a third data transfer command.

14 Claims, 5 Drawing Sheets

SYSTEMS AND METHODS FOR FILESYSTEM-BASED COMPUTER APPLICATION COMMUNICATION

BACKGROUND

This disclosure relates to filesystem-based communication of computer applications. More specifically, the disclosure relates to communication between participating applications that is abstracted away from the application layer using filesystem API calls.

The use of computer applications has proliferated in recent years beyond just a single platform or single hardware system. Various devices (e.g., desktop computers, laptop computers, game consoles, or the like) operate computer applications that generate data that the devices then may need to transmit to each other to perform various operations. The rise of the Internet of Things (IoT) has enabled connectivity to new device types, such as vehicles, home appliances, or office or industrial equipment. Each new device type will have computer applications installed on it to operate the device. Computer applications that are operating on potentially incompatible platforms increasingly need to transmit data to each other. For example, a web application on mobile computer may be used to transfer software updates to a vehicle computer application in order to keep the vehicle computer up to date.

While computer applications designed to adhere to certain protocols may be able to exchange data out of the box, different devices may use different operating systems and require a unique or proprietary communication methods. Incompatible data transfer methodologies require further coding or customization to enable interoperability. Furthermore, the development and maintenance of a computer application that exchange data with multiple other computer applications can become increasingly cumbersome. Supporting an increasing number of requirements consumes more development time and resources and/or delays computer application production. For instance, if a new device requires adherence to a specific protocol, then development resources have to be diverted to code for new interfaces for communication with the device. Likewise, the production of a computer application for the device may be delayed until it is appropriately updated to accommodate specific communication needs.

Some known systems facilitate interoperability between computer applications by providing an intermediary platform for computer application programmers. These systems are limited in that they still require programmer person-hours to be spent learning a new platform and getting it to work with their computer application. Such and other known systems are also limited in that they may require programming knowledge limited to specialists or experts in the field. Such systems may also be limited in their inability to leverage basic computer programming functions that are common to multiple platforms. Such workarounds may prove difficult or not worthwhile with respect to budgets and timelines. Workarounds may even impossible in cases where a particular computer application requires restriction of data exchange to certain protocols, such that no intermediary platform will enable the necessary interoperability.

Accordingly, there is a need for more effective techniques for enabling computer applications to provide and receive data resources from other potentially incompatible computer applications.

BRIEF DESCRIPTION

In one aspect, a method of filesystem-based communication of computer applications is provided. The method is implemented using a filesystem communications interface (FCI) computer device. The FCI computer device is communicatively coupled to a first computer on which a first computer application is installed and a second computer on which a second computer application is installed. The method includes mounting, by the FCI computer device, a first file system on the first computer and a second file system on the second computer, wherein the mounting includes installing a first communications interface driver on the first computer and a second communications interface driver on the second computer. The method also includes receiving, using the first communications interface driver, a first data transfer command that includes a first data unit from the first computer. The method further includes identifying, using the first communications interface driver, that the first data transfer command corresponds to a first filesystem-based data transfer protocol. The method also includes generating a second data transfer command by converting the first data transfer command from the first filesystem-based data transfer protocol into a first network-based data transfer protocol. The method further includes receiving, by the FCI computer device, the data unit from the first computer, using the second data transfer command. The method also includes generating, by the FCI computer device, a third data transfer command by converting the second data transfer command into a second network-based data transfer protocol. The method further includes transferring the data unit from the FCI computer device to the second computer, using the third data transfer command. The method also includes converting, using the second communications interface driver, the third data transfer command into a second filesystem-based data transfer protocol. The method further includes transmitting, using the second communications interface driver, the data unit to the second computer application by the third data transfer command.

In another aspect, a system for filesystem-based communication of computer applications is provided. The system includes a first computer operating a first computer application, a second computer operating a second computer application, and a filesystem communications interface (FCI) computer device communicatively coupled to the first computer and the second computer. The FCI computer device is configured to mount a first file system on the first computer and a second file system on the second computer, wherein the FCI computer device is further configured to install a first communications interface driver on the first computer and a second communications interface driver on the second computer. The FCI computer device is also configured to receive, using the first communications interface driver, a first data transfer command that includes a first data unit from the first computer. The FCI computer device is further configured to identify that the first data transfer command corresponds to a first filesystem-based data transfer protocol. The FCI computer device is also configured to generate a second data transfer command by converting the first data transfer command from the first filesystem-based data transfer protocol into a first network-based data transfer protocol. The FCI computer device is further configured to receive the data unit from the first computer, using the second data transfer command. The FCI computer device is also configured to generate a third data transfer command, wherein the FCI computer device is further configured to convert the second data transfer command into a second network-based data transfer protocol. The FCI computer device is further configured to transfer the data unit from the FCI computer device to the second computer, using the third data transfer command. The FCI computer device is also configured to convert, using the second communications interface driver, the third data transfer command into a second filesystem-based data transfer protocol. The FCI computer device is further configured to transmit, using the second communications interface driver, the data unit to the second computer application by the third data transfer command.

In yet another aspect, a non-transitory computer readable medium that includes computer executable instructions for filesystem-based communication of computer applications is provided. The FCI computer device is in communication with a first computer operating a first computer application and a second computer operating a second computer application. When executed by a filesystem communications interface (FCI) computer device including a processor in communication with a memory device, the computer executable instructions cause the FCI computer device to: mount a first file system on the first computer and a second file system on the second computer, wherein the FCI computer device is further configured to install a first communications interface driver on the first computer and a second communications interface driver on the second computer. The computer executable instructions also cause the FCI computer device to receive, using the first communications interface driver, a first data transfer command that includes a first data unit from the first computer. The computer executable instructions further cause the FCI computer device to identify that the first data transfer command corresponds to a first filesystem-based data transfer protocol. The computer executable instructions also cause the FCI computer device to generate a second data transfer command by converting the first data transfer command from the first filesystem-based data transfer protocol into a first network-based data transfer protocol. The computer executable instructions further cause the FCI computer device to receive the data unit from the first computer, using the second data transfer command. The computer executable instructions also cause the FCI computer device to generate a third data transfer command, wherein the FCI computer device is further configured to convert the second data transfer command into a second network-based data transfer protocol. The computer executable instructions further cause the FCI computer device to transfer the data unit from the FCI computer device to the second computer, using the third data transfer command. The computer executable instructions also cause the FCI computer device to convert, using the second communications interface driver, the third data transfer command into a second filesystem-based data transfer protocol. The computer executable instructions further cause the FCI computer device to transmit, using the second communications interface driver, the data unit to the second computer application by the third data transfer command.

BRIEF DESCRIPTION OF THE DRAWINGS

FIG. 1 shows an example message flow by which the FCI computer device establishes filesystem-based communication for computer applications.

FIG. 2 illustrates an example configuration of a computer device that interoperates with FCI computer device in a filesystem-based application network.

FIG. 3 shows an example configuration of a server system, such as the FCI computer device configured to establish filesystem-based application networking for remote computer applications.

FIG. 4 shows an example method flow illustrating how the FCI computer device establishes and operates a filesystem-based application network.

FIG. 5 shows an example configuration of a database within a computer device, along with other related computer components, that may be used to establish and operate a filesystem-based application network.

Like numbers in the Figures indicate the same or functionally similar components.

DETAILED DESCRIPTION

Figure 1:
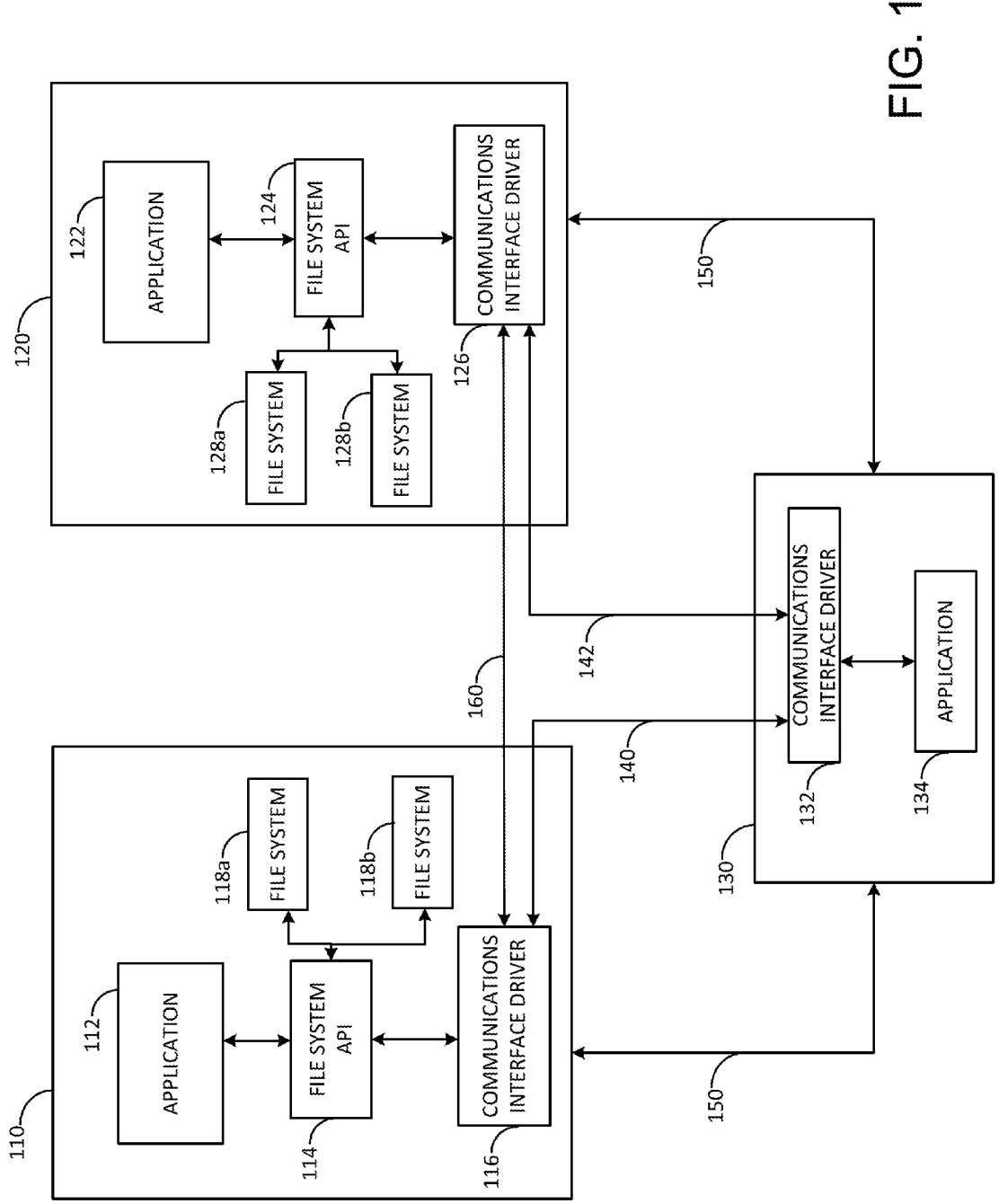
FIGS. 1-5 show example embodiments of the methods and systems described herein.

Systems and methods described herein relate generally to transferring data between computer applications using a filesystem communications interface (FCI) computer device. In at least some implementations, the application using FCI computer device is in communication with a first remote computer device (e.g., a desktop computer, a vehicle computer, or an appliance computer). Each of the FCI computer device and the first remote computer device operates one or more computer applications, referred to herein as the FCI computer application and the first remote computer application, respectively. The FCI computer device is configured to mount a filesystem on the first remote computer device. The mounted filesystem appears as just another filesystem to the FCI computer device and thereby to the computer application (and thus to a programmer of the computer application).

In other implementations, the FCI computer device may be a software component embedded within the remote computer device. For example, rather than an intermediary computer device like the FCI computer device facilitating communications between two remote computer devices, the functions of the FCI computer device may be performed by a software-based component installed on either remote computer device. Accordingly, the functions described herein with respect to the FCI computer device are contemplated as capable of being performed by a software-based FCI computer device that operates from one or more remote computer devices as defined herein.

As a preliminary matter, a user of the first remote computer device may consent to the FCI computer device contacting the user's first remote computer device. For example, the user may register online to use the FCI computer device by providing information for the first remote computer device using a web form, for example. In the exemplary embodiment, the user consents to the FCI computer device transmitting certain data (e.g., filesystem code, discussed in more detail below) to enable communication between the FCI computer device and the first remote computer device.

In at least some implementations, the first remote computer application may need to transfer data to a second remote computer application operating on a second remote computer device. The operating systems, communications protocols, application programming interfaces (APIs) or other components may differ across the remote computer devices and may be incompatible. To enable communication between the two remote computer devices, the FCI computer device is configured to mount a filesystem on the second remote computer device as well. The FCI computer device acts as an intermediary between the first remote computer device and the second remote computer device (collectively referred to herein as "remote computer devices"). For programmers of applications on each remote computer device, the FCI computer device eliminates the need to understand and implement incompatible data transfer topologies/technologies.

For example, the first remote computer device may be a home appliance and the first remote computer application may be an ordering application. The second remote computer device may be a computer server for an online vendor and the second remote computer application may be an order processing application. Furthermore, the first remote computer device is directed by its user to write to a file (which may be an order file generated by the first remote computer application) to the second remote computer device (e.g., to process the order by the second remote computer application). As used herein, a "data unit" refers to any datagram, data packet, byte sequence, bit sequence, or file that can be transferred or streamed from one computer to another.

In at least some implementations, the FCI computer device has connectivity to both remote computer devices (e.g., via the Internet). Each of the first and the second remote computer devices will have associated electronic storage media, such as an internal hard disk. The internal hard disk may already have an existing filesystem associated with it. As an example, the internal hard disk may be divided into one or more partitions, each corresponding to one or more volumes of the hard disk and denoted by drive letters (e.g., A:, B:, or C:). Each drive letter may represent one or more directory structures hosted on the internal hard drive. As another example, the internal hard disk may be organized as a single, un-partitioned root directory, on which additional volumes can be "mounted," such that the additional volumes appear as another sub-directory of the root directory.

The FCI computer device is configured to transmit filesystem code to each remote computer device in order to mount a new filesystem that is distinguishable from any existing filesystem(s) on the remote computer devices. In one embodiment, filesystem code takes the form of software instructions that include commands for mounting a new filesystem along with required parameters. For example, users of the remote computer devices may access an online application store and download an application to their respective remote computer device. The application includes the filesystem code.

The new filesystem is to be mounted on, for example, an internal hard disk associated with the remote computer devices. In one embodiment, the transmitted filesystem code causes the remote computer devices to create a mount point on the root directory residing on the internal hard disk. The new mount point will house the directory structure for the newly created filesystem. In another embodiment, the transmitted filesystem code causes the remote computer devices to create a new partition on the internal hard disk, corresponding to the newly created filesystem. At least one folder is created within the new filesystem. Computer applications on the remote computer devices will to write files to and read files from the folder. In at least some implementations, a computer application will use a file system application programming interface (API) to perform the file write operation.

Additionally, the FCI computer device configures the filesystem code to customize access for all computer applications to the new filesystem. Access may be granted to all or only some specific computer applications (i.e., access to read and write files from the folder on the new filesystem). In one embodiment, the filesystem code runs in a non-privileged user-space. This means that no special permissions are required to set up the new filesystem, nor is any operating system code accessed or modified in creating the filesystem. As part of the filesystem code, a bridge module may be used that provides communication between the new filesystem and the underlying operating system code (or kernel code).

In addition, the filesystem code includes code for one or more communications interface drivers. As used herein, a communications interface driver refers to a set of software instructions that will interact with the remote computer device operating system, computer applications, and networking hardware in order to transfer data to and from the remote computer device. In the exemplary embodiment, the remote computer devices and the FCI computer device will communicate data to each other using one or more data transfer commands. A data transfer command data set that one computer application wishes to communicate to another, and at least one target identifier. The target identifier may be an identifier of the target computer application, the target remote computer device, or some combination of the two. Additionally, there may be two target identifiers, one to identify the FCI computer device as the initial target of the data unit, and another to identify the second remote computer application as the final target of the data unit.

The communications interface driver is configured to convert a data transfer command from one protocol to another and transfer the data from one remote computer device to the FCI computer device to, for example, an underlying transfer protocol such as HTTP. The data transfer takes place as required by the underlying transfer mechanism. In the exemplary embodiment, a data transfer command is in a "filesystem-based data transfer protocol" or a "network-based data transfer protocol." As used herein, a filesystem-based data transfer protocol refers to a protocol that a data transfer command is using such that it can be used to transfer a file (or streaming data) to different locations within a filesystem using common filesystem functions. For example, the data transfer command may be to generate the data unit, save the data unit to a folder, copy the data unit from one folder into another, cut the data unit from one folder and paste it into another folder, delete the data unit, clone the data unit, and so on. A programmer of a remote computer application may require no specialized knowledge of the underlying communication channel (e.g., HTTP) in order to communicate to the remote computer application.

As used herein, a network-based data transfer protocol refers to a communications method, format, protocol, specification, or the like that is used to enable communication between two or more computer devices. One example of a network-based data transfer protocol is the HyperText Transfer Protocol (HTTP) that is used for data communication over the World Wide Web. Using HTTP, a computer device X will request a resource from another computer device Y using the data transfer command "HTTP POST/GET". Computer device Y will respond by transmitting the resource by HTTP response. Other network-based data transfer protocols may include the Transmission Control Protocol (TCP), the Internet Protocol (IP), File Transfer Protocol (FTP), message queues (MQ), or the like.

Accordingly, the communications interface driver on the first remote computer application is configured to convert a data transfer command from network-based data transfer protocol to a filesystem-based data transfer protocol in order to transfer the data unit to the FCI computer device. In the exemplary embodiment, the "file write" is a data transfer command in a filesystem-based data transfer protocol. Additionally, the FCI computer device is configured, in the exemplary embodiment, to use HTTP for data exchange with other computer devices. The communications interface driver is configured to convert the "file write" command into an "HTTP POST" command. The "HTTP POST" command will be used to transfer the data unit to the FCI computer device.

In the exemplary embodiment, the FCI computer device is configured to receive the data unit from the first remote computer device and prepare the data unit for transmission to the second remote computer device. The FCI computer device itself has a communications interface driver configured to convert the incoming data transfer command (an "HTTP GET") into the appropriate protocol to proceed. To do this, the FCI computer device detects target identifiers within the data transfer command. In the exemplary embodiment, the target is the second remote computer device which is an online vendor that will process the data unit (which is an order for supplies). Having determined the target, the FCI computer device is configured to determine a second network-based data transfer protocol that is compatible with the second remote computer device. In the exemplary embodiment, the FCI computer device maintains a list of data transfer protocols associated with each remote computer device connected to the FCI computer device. For example, the FCI computer device may determine that the second network-based data transfer protocol that online vendor uses is the File Transfer Protocol (FTP).

Accordingly, the FCI computer device directs its communications interface driver to convert the "HTTP POST" (by which the data unit was received from the first remote computer device or home appliance) into an "FTP GET". "FTP GET" is the command used to transfer a file using FTP to the online vendor. The communications driver generates an "FTP GET" command, is triggered by a read command received to read data received from the online vendor's computer server. The flow of data units from the first remote computer device to the second remote computer device may execute in independent processes and asynchronously.

The FCI computer device is also configured to perform the abovementioned communication functions in reverse (i.e., from the second remote computer device back to the first remote computer device). The FCI computer device is also configured to perform the abovementioned communication functions in conjunction with more than two remote computer devices. In another embodiment, the FCI computer device commands its communications interface driver to first convert the data transfer command (e.g., HTTP GET) received from the first remote computer device into a filesystem-based data transfer protocol. For example, the FCI computer device may need to save the file received via HTTP GET into a specific folder on the FCI computer device's own filesystem. It may be necessary to copy the data unit to an archive folder before the data unit is sent to the second remote computer application.

The technical problems addressed by this system include at least one of: (i) inability of incompatible computer applications to exchange data without substantial additional software that is programmed to enable interoperability every time such communication is needed, (ii) inability of computer applications to exchange data with other computer applications that simply do not permit interoperability even with additional software, (iii) wasted capacity on computer devices which have installed computer applications that could be leveraging other computer applications (e.g., a home appliance application could use multiple online vendors instead of just the one it is preprogrammed to communicate with), and (iv) network problems caused by computer applications being forcibly limited to send all their data traffic to only certain other computer applications, leading to slower traffic on certain network routes. (v) providing single consistent interface communication thereby opening up opportunities around new domains and business models, thereby increasing the reach of the vendors and providing more options to the customers, and also allowing support for newer communication channels more easily without a programmer needing to learn new communication channel APIs.

The methods and systems described herein may be implemented using computer programming or engineering techniques including computer software, firmware, hardware, or any combination or subset thereof, wherein the technical effects may be achieved by (a) mounting, by the FCI computer device, a first file system on the first computer and a second file system on the second computer, wherein the mounting includes installing a first communications interface driver on the first computer and a second communications interface driver on the second computer, (b) receiving, using the first communications interface driver, a first data transfer command that includes a first data unit from the first computer, (c) identifying, using the first communications interface driver, that the first data transfer command corresponds to a first filesystem-based data transfer protocol, (d) generating a second data transfer command by converting the first data transfer command from the first filesystem-based data transfer protocol into a first network-based data transfer protocol, (e) receiving, by the FCI computer device, the data unit from the first computer, using the second data transfer command, (f) generating, by the FCI computer device, a third data transfer command by converting the second data transfer command into a second network-based data transfer protocol, (g) transferring the data unit from the FCI computer device to the second computer, using the third data transfer command, (h) converting, using the second communications interface driver, the third data transfer command into a second filesystem-based data transfer protocol, and (i) transmitting, using the second communications interface driver, the data unit to the second computer application by the third data transfer command.

The resulting technical benefits achieved by this system include at least one of: (i) new and improved usage of existing filesystem APIs that application programmers already know how to use, (ii) improved network distribution because computer applications are not confined to communicating with only certain other computer applications such that certain communication channels become overloaded, (iii) improved security due to encrypted communication channels between the FCI computer device and the other remote computer devices, and (iv) improved error handling as only the FCI computer device and the communications interface drivers handle errors and exceptions generated during data transfer such that application programmers need not learn or worry about error handling related to data traffic.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable storage medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application in industrial, commercial, and academic applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 shows an example message flow by which the FCI computer device establishes filesystem-based communication for computer applications. As shown, FCI computer device 130 is in communication with computer devices 110 and 120. Computer device 110 has installed on it computer application 112. For illustration purposes only, computer device 110 is assumed to be a home appliance, such as a refrigerator. Computer application 112 is a computer program designed to perform one or more functions, tasks, or activities for the benefit of a user of computer application 112. For illustration purposes only, computer application 112 is a home appliance management application that is configured to manage the functions of a home appliance, such as a refrigerator. For example, computer application 112 may be used to monitor refrigerator temperature, monitor electricity usage, or the like. In the exemplary embodiment, computer application 112 is configured to connect with an online vendor to order grocery items that will be stored in the refrigerator. For example, a user of computer device 110 may use computer application 112 to order produce from an online vendor that is connected to computer device 110 via, for example, the Internet.

Computer application 112 also uses a file system API 114 to communicate with a filesystem 118a. In the exemplary embodiment, filesystem 118a is an existing filesystem that computer application 112 currently uses. A new filesystem 118b is mounted to computer device 110 as will be explained in greater detail below. Additionally, a communications interface driver 116 is installed on computer device 110 as will be explained in greater detail below.

Computer device 120 has installed on it computer application 122. For illustration purposes only, computer device 120 is assumed to be a computer server for a business, such as an online vendor of consumer products. Computer application 122 is a computer program designed to perform one or more functions, tasks, or activities for the benefit of a user of computer application 122. For illustration purposes only, computer application 122 is an online vendor web application that is configured to provide website functions to a user. For example, computer application 122 may be used to display web pages to a user, receive data from the user, or the like. In the exemplary embodiment, computer application 122 is configured to receive order data for items the user will purchase from the online vendor.

In the exemplary embodiment, the functions of FCI computer device 130 are implemented by specifically configured sub-components that include computer application 134 and communications interface driver 132. For example, computer application 134 is configured to transmit filesystem code that will act to mount a filesystem and install communications interface drivers on computer devices 110 and 120. Computer application 134 is configured to receive data transfer commands and extract relevant data. Computer application 134 is configured to determine a target identifier embedded within a data transfer command generated computer application 112 or 122. Computer application 134 is further configured to direct communications interface driver 132 to convert the data transfer commands into appropriate protocols.

In the exemplary embodiment, FCI computer device 130 transmits 150 filesystem code to computer device 110 and computer device 120. The filesystem code interacts with operating system software (not shown) on both computer device 110 and computer device 120 to a) mount a filesystem and b) install a communications driver on each computer device. As shown, filesystem 118b is mounted on computer device 110 and filesystem 128b is mounted on computer device 120. The mounting process further entails enabling the filesystem APIs 114 and 124 to connect to the new filesystems 118b and 128b. As a result, computer applications 112 and 122 are able to access filesystems 118b and 128b respectively and, for example, write files to folders, read files, edit files, or the like. This is similar to how computer applications 112 and 122 were previously able to access filesystems 118b and 128b respectively.

Additionally, the filesystem code transmitted at 150 causes each of filesystem 118a and filesystem 128a to create at least one folder in the filesystem. In one embodiment, a folder identifier is communicated back to FCI computer device 130 via communication interface drivers 116 and 126.

Furthermore, the mounting process includes installing communications interface driver 116 on computer device 110 and communications interface driver 126 on computer device 120. In the exemplary embodiment, communications interface driver 116 and communications interface driver 126 are configured to begin controlling (or sharing control with another network driver) the networking hardware (not shown) on computer device 110 and computer device 120 respectively. Additionally, communications interface driver 116 and communications interface driver 126 connect to the respective filesystem APIs 114 and 124 respectively in order to process data units generated by computer application 110 and 120 respectively.

In the exemplary embodiment, computer application 112 generates a data unit. For illustration purposes, the data unit may be an entry in an order file including order data (e.g., a unit count (5), a unit type (apples), a target identifier (online vendor name)). Computer application 112 uses filesystem API 114 to save the data unit to filesystem 118b. In one embodiment, computer application 112 uses a data transfer command of "file write" to save the data unit. The "file write" data transfer command is in a filesystem-based data transfer protocol.

Communications interface driver 116 detects, via filesystem API 114, that a new data unit has been saved to a folder in filesystem 118b. Accordingly, communications interface driver 116 is configured to convert the "file write" data transfer command from a filesystem-based data transfer protocol into a network-based data transfer protocol in order to transmit the data unit to FCI computer device 130. In the exemplary embodiment, when FCI computer device 130 transmits the filesystem code to install the communications interface drivers 116 and 126, it also configures these drivers to convert data transfer commands into the network-based data transfer protocol suited to FCI computer device 130. For example, communications interface driver 116 is configured to convert the "file write" into an "HTTP POST" data transfer command because FCI computer device 130 uses HTTP for networked data transfer. Alternatively, communications interface driver 116 first uses file system API 114 to read in the file using a "file read" data transfer command, and then converts the "file read" into an "HTTP POST" data transfer command. Communications interface driver 116 uses the "HTTP POST" data transfer command to transfer 140 the data unit to FCI computer device 130.

On receipt of the file, FCI computer device 130 is configured to determine the destination (e.g., an online vendor running computer application 122) based on the received data unit. FCI computer device 130 (or component computer application 134) is configured to determine the network-based data transfer protocol that is compatible with the computer application 122. In the exemplary embodiment, computer application 122 is compatible with the FTP network-based data transfer protocol. Accordingly, FCI computer device 130 is configured to direct communications interface driver 132 to convert the "HTTP POST" into an "FTP PUT" data transfer command in order to send the data unit to computer application 122.

The "FTP PUT" data transfer command (including the data unit) is then transmitted 142 to computer device 120. More specifically, the "FTP PUT" data transfer command is received by communications interface driver 126 installed on computer device 120. Communications interface driver 126 is configured to convert this data transfer command from a network-based data transfer protocol into a filesystem-based data transfer protocol compatible with computer device 120. In the exemplary embodiment, communications interface driver 126 converts the "FTP PUT" data transfer command into a "file write" data transfer command (including the data unit). Communications interface driver 126 uses this "file write" to write the data unit to a folder in filesystem 128b for consumption by computer application 122.

In an alternate embodiment, communications interface driver 116 and 126 are configured to communicate with each other without routing communications through FCI computer device 130. More specifically, the functionality described with respect to FCI computer device 130 is performed by either of communications interface driver 116 and/or communications interface driver 126. As shown in FIG. 1, communications interface driver 116 and communications interface driver 126 communicate via a network route 160.

Figure 2:
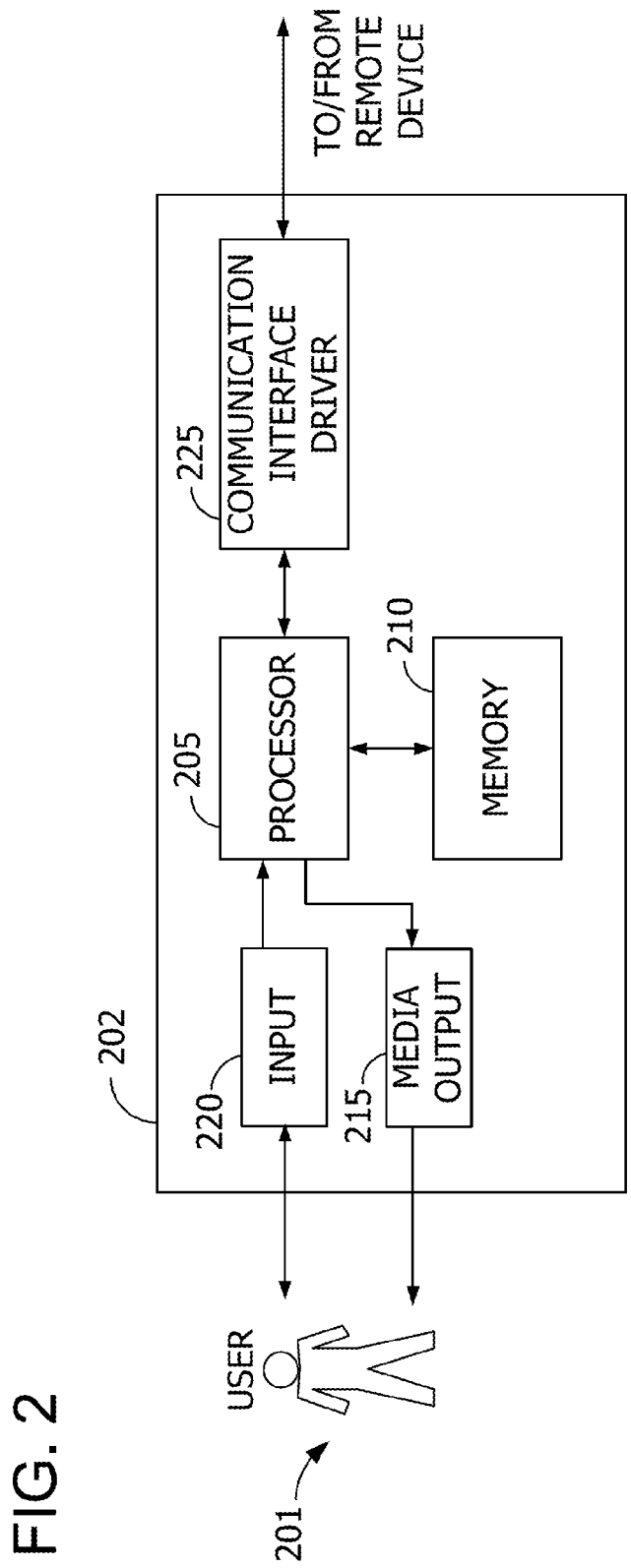

FIG. 2 illustrates an example configuration of a computer device that interoperates with FCI computer device in a filesystem-based network. Computer device 202 may include, but is not limited to, computer devices 110 and 120 (shown in FIG. 1). In the example embodiment, computer device 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

Computer device 202 also includes at least one media output component 215 for presenting information to user 201. Media output component 215 is any component capable of conveying information to user 201. For example, media output component 215 may be a display component configured to display application data to user 201. In some embodiments, media output component 215 includes an output adapter such as a video adapter and/or an audio adapter. An output adapter is operatively coupled to processor 205 and operatively connectable to an output device such as a display device, a liquid crystal display (LCD), organic light emitting diode (OLED) display, or "electronic ink" display, or an audio output device, a speaker or headphones.

In some embodiments, computer device 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. Computer device 202 may also include a Communication interface driver 225, which is communicatively connectable to a remote device such as Server system 112. Communication interface driver 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX). Stored in memory area 210 are, for example, computer readable instructions for providing a user interface to user 201 via media output component 215 and, optionally, receiving and processing input from input device 220. A user interface may include, among other possibilities, a web browser and computer application.

Figure 3:
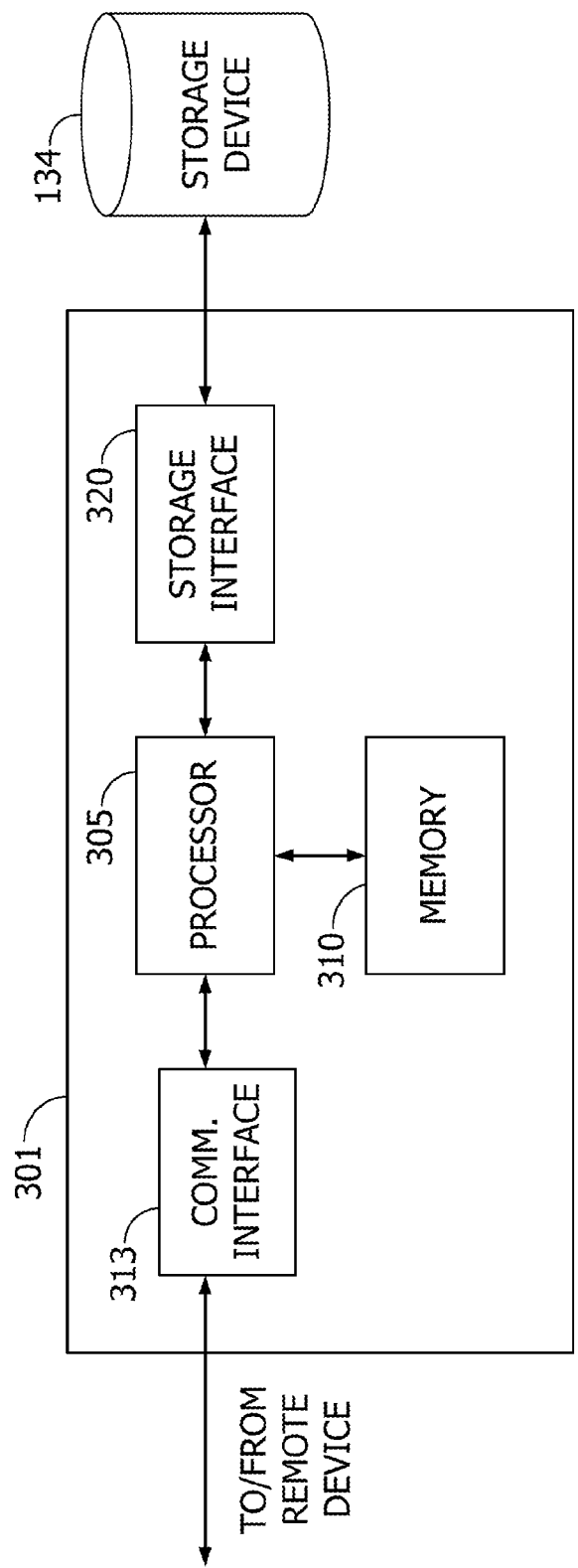

FIG. 3 illustrates an example configuration of a server system 301 such as FCI computer device 130 (shown in FIG. 1). Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. More specifically, the instructions may cause various data manipulations on data stored in storage 134 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.). Processor 305 is operatively coupled to a communication interface 315 such that server system 301 is capable of communicating with a remote device such as a computer device or another server system 301.

Processor 305 may also be operatively coupled to a storage device 134. Storage device 134 is any computer-operated hardware suitable for storing and/or retrieving data. In some embodiments, storage device 134 is integrated in server system 301. In other embodiments, storage device 134 is external to server system 301 and is similar to database 120 (shown in FIG. 2). For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 4:
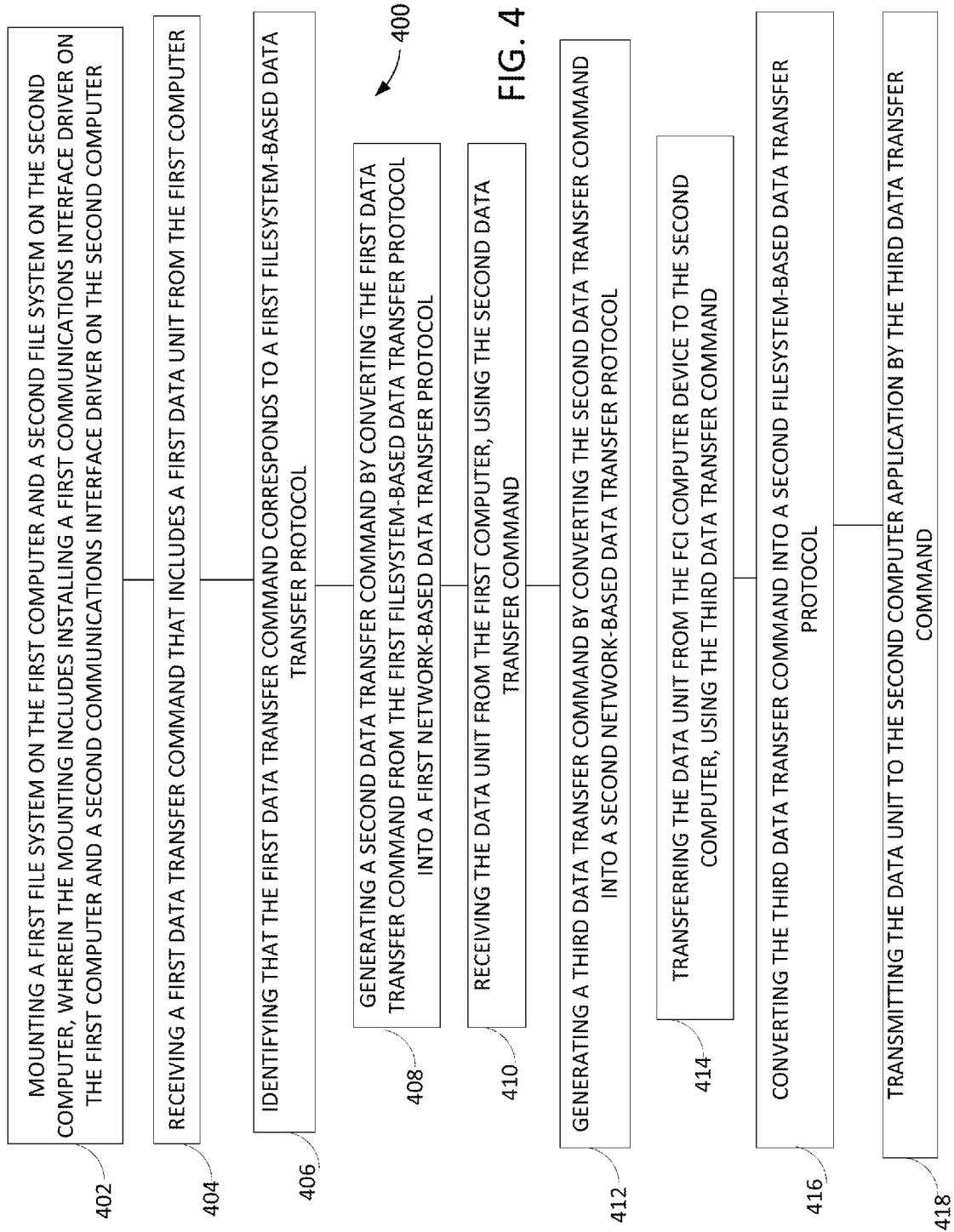

FIG. 4 shows an example method flow illustrating how the FCI computer device establishes and operates a filesystem-based application network. In the example embodiment, FCI computer device 130 (shown in FIG. 1) mounts 402, a first file system on the first computer and a second file system on the second computer. Additionally, the FCI computer device is further configured to install a first communications interface driver on the first computer and a second communications interface driver on the second computer. The FCI computer device 130 receives 404, using the first communications interface driver, a first data transfer command that includes a first data unit from the first computer. The FCI computer device 130 identifies 406 that the first data transfer command corresponds to a first filesystem-based data transfer protocol. The FCI computer device 130 generates 408 a second data transfer command by converting the first data transfer command from the first filesystem-based data transfer protocol into a first network-based data transfer protocol. The FCI computer device 130 receives 410 the data unit from the first computer, using the second data transfer command. The FCI computer device 130 generates 412 a third data transfer command, wherein the FCI computer device is further configured to convert the second data transfer command into a second network-based data transfer protocol. The FCI computer device 130 transfers 414 the data unit from the FCI computer device to the second computer, using the third data transfer command. The FCI computer device 130 converts 416, using the second communications interface driver, the third data transfer command into a second filesystem-based data transfer protocol. The FCI computer device 130 transmits 418, using the second communications interface driver, the data unit to the second computer application by the third data transfer command.

Figure 5:
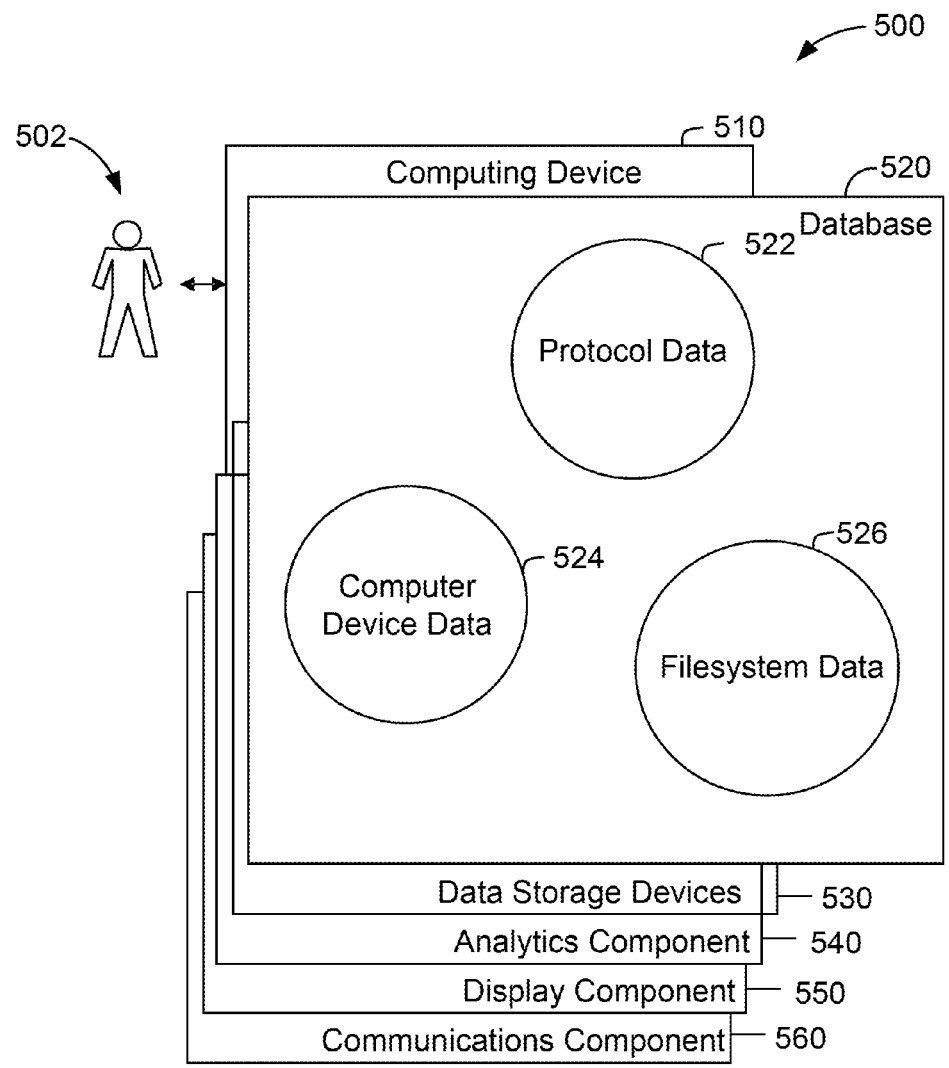

FIG. 5 shows an example configuration of a database 500 within a computer device, along with other related computer components, that may be used to establish and operate a filesystem-based application network. In some embodiments, computer device 510 is similar to FCI computer device 130 (shown in FIG. 1). User 502 (such as a user operating FCI computer device 130) may access computer device 510 in order to transmit filesystem code to remote computer devices and thereby mount filesystems on the remote computer devices. In some embodiments, database 520 is similar to storage device 134 (shown in FIG. 3). In the example embodiment, database 520 includes protocol data 522, computer device data 524, and filesystem data 526. Protocol data 522 includes data regarding filesystem-based data transfer protocols and network-based data transfer protocols that are associated with the FCI computer device 130 and other connected remote computer devices, or the like. Protocol data 522 also includes protocol conversion algorithms and/or software code that is used to convert data transfer commands from one protocol into another protocol.

Computer device data 524 includes data regarding connected remote computer devices. This includes computer device identifiers such as computer names, IP or MAC addresses, associated owner or user identifiers, operating system identifiers, or the like. Filesystem data 526 includes filesystem code that is used to mount a filesystem to a remote computer device. Filesystem code will include specific mounting commands, parameters for mounting, directory partitioning or branching instructions, or the like.

Computer device 510 also includes data storage devices 530. Computer device 510 also includes analytics component 540 that processes incoming data transfer commands and determines the associated protocols. Computer device 510 also includes display component 550 that can be used by user 502 to view incoming data transfer commands and the outputted data transfer commands (i.e., those converted to the target protocols). Computer device 510 also includes communications component 560 which is used to communicate with remote computer devices. In one embodiment, communications component 560 is similar to communications interface driver 132 (shown in FIG. 1).

As will be appreciated based on the foregoing specification, the above-described embodiments of the disclosure may be implemented using computer programming or engineering techniques including computer software, firmware, hardware or any combination or subset thereof, wherein the technical effect is to establish and operate a filesystem-based application network. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of filesystem-based communication of computer applications, the method implemented using a filesystem communications interface (FCI) computer device, the FCI computer device being communicatively coupled to a first computer on which a first computer application is installed and a second computer on which a second computer application is installed, the method comprising:
    mounting, by the FCI computer device, a first file system on the first computer and a second file system on the second computer, wherein the mounting includes installing a first communications interface driver on the first computer and a second communications interface driver on the second computer;
    receiving, using the first communications interface driver, a first data transfer command that includes a first data unit and a target identifier from the first computer;
    identifying, using the first communications interface driver, that the first data transfer command corresponds to a first filesystem-based data transfer protocol;
    generating a second data transfer command by converting the first data transfer command from the first filesystem-based data transfer protocol into a first network-based data transfer protocol;
    receiving, by the FCI computer device, the first data unit from the first computer, using the second data transfer command;
    generating, by the FCI computer device, a third data transfer command by converting the second data transfer command into a second network-based data transfer protocol, the second network-based data transfer protocol being based on the target identifier;
    transferring the first data unit from the FCI computer device to the second computer, using the third data transfer command;
    converting, using the second communications interface driver, the third data transfer command into a second filesystem-based data transfer protocol; and
    transmitting, using the second communications interface driver, the first data unit to the second computer application by the third data transfer command, and
    wherein the first network-based data protocol and the second network-based data protocol are configured to deliver the first data unit as an ordered byte stream.

2. A method in accordance with claim 1, further comprising identifying that the first data unit is saved by the first computer application in a first folder of the first file system.

3. A method in accordance with claim 1, wherein transmitting the first data unit to the second computer application further comprises uploading the first data unit to a second folder of the second file system.

4. A method in accordance with claim 1, wherein the mounting includes generating a first mount point on a first electronic storage medium associated with the first computer and a second mount point on a second electronic storage medium associated with the second computer.

5. A method in accordance with claim 1, wherein the first data transfer command includes the target identifier, and wherein the target identifier includes at least one of an identifier for the second computer and an identifier for the second computer application.

6. A system for filesystem-based communication of computer applications, the system comprising:
    a first computer operating a first computer application;
    a second computer operating a second computer application;
    a filesystem communications interface (FCI) computer device communicatively coupled to the first computer and the second computer, the FCI computer device configured to:
    mount a first file system on the first computer and a second file system on the second computer, wherein the FCI computer device is further configured to install a first communications interface driver on the first computer and a second communications interface driver on the second computer;
    receive, using the first communications interface driver, a first data transfer command that includes a first data unit and a target identifier from the first computer;
    identify that the first data transfer command corresponds to a first filesystem-based data transfer protocol;
    generate a second data transfer command by converting the first data transfer command from the first filesystem-based data transfer protocol into a first network-based data transfer protocol;
    receive the first data unit from the first computer, using the second data transfer command;
    generate a third data transfer command, wherein the FCI computer device is further configured to convert the second data transfer command into a second network-based data transfer protocol, the second network-based data transfer protocol being based on the target identifier;
    transfer the first data unit from the FCI computer device to the second computer, using the third data transfer command;
    convert, using the second communications interface driver, the third data transfer command into a second filesystem-based data transfer protocol; and transmit, using the second communications interface driver, the first data unit to the second computer application by the third data transfer command, and wherein the first network-based data protocol and the second network-based data protocol are configured to deliver the first data unit as an ordered byte stream.

7. A system in accordance with claim 6, wherein the FCI computer device is further configured to identify that the first data unit is saved by the first computer application in a first folder of the first file system.

8. A system in accordance with claim 6, wherein the FCI computer device is further configured to upload the first data unit to a second folder of the second file system.

9. A system in accordance with claim 6, wherein the FCI computer device is further configured to generate a first mount point on a first electronic storage medium associated with the first computer and a second mount point on a second electronic storage medium associated with the second computer.

10. A system in accordance with claim 6, wherein the first data transfer command includes the target identifier, and wherein the target identifier includes at least one of an identifier for the second computer and an identifier for the second computer application.

11. A non-transitory computer readable medium that includes computer executable instructions for filesystem-based communication of computer applications executed by a filesystem communications interface (FCI) computer device comprising a processor in communication with a memory device, the FCI computer device being in communication with a first computer operating a first computer application and a second computer operating a second computer application, wherein the computer executable instructions cause the FCI computer device to:

mount a first file system on the first computer and a second file system on the second computer, wherein the FCI computer device is further configured to install a first communications interface driver on the first computer and a second communications interface driver on the second computer;

receive, using the first communications interface driver, a first data transfer command that includes a first data unit and a target identifier from the first computer;

identify that the first data transfer command corresponds to a first filesystem-based data transfer protocol;

generate a second data transfer command by converting the first data transfer command from the first filesystem-based data transfer protocol into a first network-based data transfer protocol;

receive the first data unit from the first computer, using the second data transfer command;

generate a third data transfer command, wherein the FCI computer device is further configured to convert the second data transfer command into a second network-based data transfer protocol, the second network-based protocol being based on the target identifier;

transfer the first data unit from the FCI computer device to the second computer, using the third data transfer command;

convert, using the second communications interface driver, the third data transfer command into a second filesystem-based data transfer protocol; and transmit, using the second communications interface driver, the first data unit to the second computer application by the third data transfer command, and wherein the first network-based data protocol and the second network-based data protocol are configured to deliver the first data unit as an ordered byte stream.

12. A non-transitory computer readable medium in accordance with claim 11, wherein the computer-executable instructions further cause the FCI computer device to upload the first data unit to a second folder of the second file system.

13. A non-transitory computer readable medium in accordance with claim 11, wherein the computer-executable instructions further cause the FCI computer device to generate a first mount point on a first electronic storage medium associated with the first computer and a second mount point on a second electronic storage medium associated with the second computer.

14. A non-transitory computer readable medium in accordance with claim 11, wherein the first data transfer command includes the target identifier, and wherein the target identifier includes at least one of an identifier for the second computer and an identifier for the second computer application.

* * * * *